United States Patent [19]

Groen et al.

[11] Patent Number: 4,567,534
[45] Date of Patent: Jan. 28, 1986

[54] APPARATUS FOR READING A DISC-SHAPED RECORD CARRIER

[75] Inventors: Robertus W. C. Groen; Cornelis A. M. de Jonge; Lawrence M. Schwartz; Johannes C. van Lier, all of Eindhoven, Netherlands

[73] Assignee: U.S. Philips Corporation, New York, N.Y.

[21] Appl. No.: 559,064

[22] Filed: Dec. 7, 1983

[30] Foreign Application Priority Data

Jan. 9, 1983 [NL] Netherlands ................. 8303046

[51] Int. Cl.⁴ .................................. H04N 5/85
[52] U.S. Cl. .......................... 358/342; 358/907
[58] Field of Search ............. 358/312, 314, 319, 327, 358/336, 342, 907; 360/10.1, 10.2

[56] References Cited

U.S. PATENT DOCUMENTS

| 4,414,584 | 11/1983 | Kurata | 358/342 |
| 4,463,388 | 7/1984 | Sugiyama et al. | 358/342 |
| 4,472,795 | 9/1984 | Sugiyama et al. | 358/342 |
| 4,482,925 | 11/1984 | Sugiyama et al. | 358/342 |
| 4,488,184 | 12/1984 | Kurata | 358/342 |

*Primary Examiner*—Donald McElheny, Jr.
*Attorney, Agent, or Firm*—Robert T. Mayer; Algy Tamoshunas

[57] ABSTRACT

The invention relates to a video-disc player in which by controlling a pivotal mirror rapid jumps over a large number of tracks can be made substantially within the field-blanking interval. In order to minimize the picture disturbance the jump is always started at the instant at which the duration of the remaining period until just before the address code within the next field blanking interval is equal to the anticipated duration of the jump to be performed in particular by measuring the time which has elapsed since the previous read-out of an address code.

3 Claims, 5 Drawing Figures

4,567,534

APPARATUS FOR READING A DISC-SHAPED RECORD CARRIER

BACKGROUND OF THE INVENTION

The invention relates to an apparatus for reading a disc-shaped record carrier in which video signals are recorded in substantially spiral tracks in such a way that corresponding picture elements of consecutive pictures are situated at substantially the same circumferential position on said record carrier, an address code being contained in at least one of the two fields of each video picture in said video signals at a predetermined position in the field blanking after the field-synchronizing pulse, which apparatus comprises:

- an optical system for aiming a light beam at the record carrier, said light beam being modulated by the record carrier, and for converting said modulated light beam into an electric signal,
- a converter for converting said electric signal into a radial tracking-error signal which corresponds to the radial position of the landing spot of the light beam relative to a desired track,
- positioning means for controlling the position of the landing spot of the light beam as a function of the radial tracking-error signal,
- a jump-signal generator for generating a control signal for causing the landing sport of the light beam to be shifted over a predetermined distance in response to a jump signal, and
- means for applying said control signal to the positioning means during said jump.

An example of such an apparatus is the video-disc player which is commercially available from N. V. Philips' Gloeilampenfabrieken under the designation "Laservision" and which is described inter alia in the magazine "Philips Technical Review", Vol. 33, 1973, No. 7 pages 177–193 and U.S. Pat. No. Re. 29,963. In this known apparatus a jump of one or a few tracks is made in order to obtain still picture, slow motion etc. In said apparatus a predetermined signal is applied via the field synchronizing pulse during the field-blanking interval in order to obtain a jump of the positioning means over a specific distance.

For some uses, such as in interactive video disc players which cooperate with a game computer, it is desirable to have the possibility of changing the scene being reproduced. Accordingly, the landing spot of the laser beam must be changed very rapidly over a large number of tracks in a radial direction by the positioning means, for example, a pivotal mirror, though it is also possible to use other actuators such as linearly moving actuators. In particular because in such a case a plurality of scenes may have been recorded in parallel and may change from track to track, it is essential that such a jump in a radial direction ends at the desired track, because otherwise a scene other than the desired scene is reached. In order to be able to ascertain immediately whether a jump is correct it is therefore necessary that the address code can be read after the jump and consequently the jump is always terminated before said address code is read.

SUMMARY OF THE INVENTION

It is the object of the invention to provide an apparatus of the type specified in the opening paragraph by means of which said jumps can be effected in such a manner that they always terminate before said address code and in such a manner that the disturbance of the picture is minimal.

To this end the invention is characterized by

- means for generating a first signal which is a continuous measure of the duration of the period of time up to a reference point in the field-blanking, which point precedes said address code,
- means for generating a second signal under command of the jump signal, which second signal is a measure of the anticipated duration of the jump to be performed in response to said command, and
- means for continuously comparing said first and said second signal and, in relation to the instant at which the two durations corresponds, generating a start signal for the jump-signal generator at least if said instant appears prior to the field synchronizing pulse preceding said address code.

The steps in accordance with the invention ensure that the jump always terminate prior to the read-out of the address code. Maximum jumps longer than the field-blanking interval are permissible without the picture being disturbed significantly, because the video signal of only the preceding field is disturbed and not to more than the necessary extent. If the jumps are longer than the field-blanking intervals, the disturbance then appears in the lower lines of the picture in only one field during a change of scene.

With respect to the means for generating the first signal, the apparatus may further be characterized in that said means for generating the first signal comprise counting means which are started each time that an address code appears.

BRIEF DESCRIPTION OF THE DRAWINGS

The invention will now be described in more detail, by way of example, with reference to the drawings in which.

DESCRIPTION OF THE PREFERRED EMBODIMENTS

Figure 1:
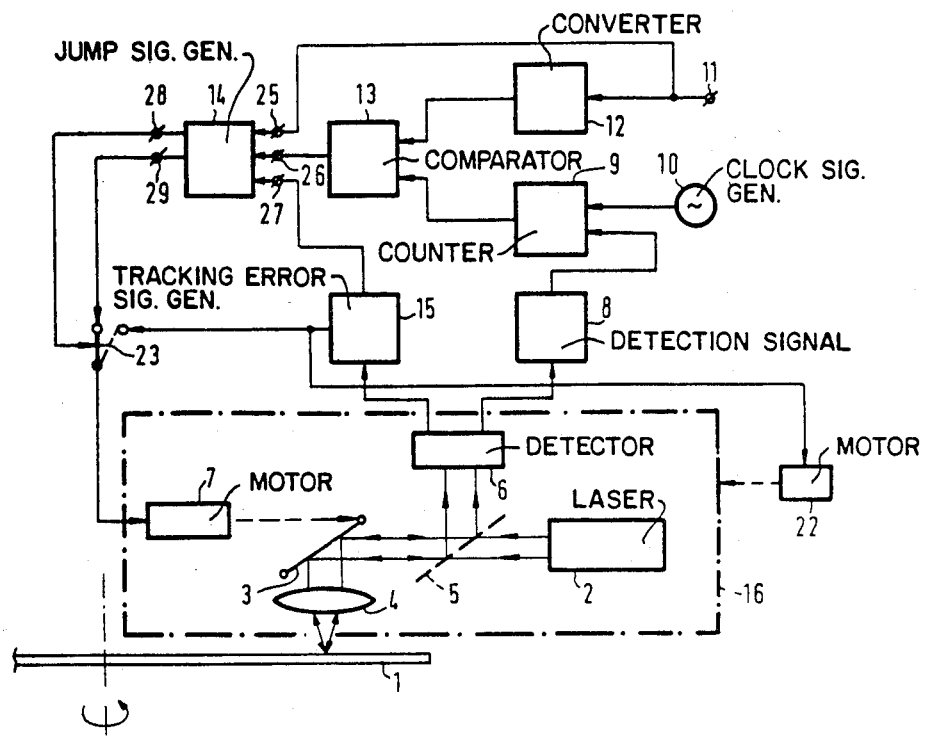
FIG. 1 shows an apparatus in accordance with the invention.

FIG. 1 shows an apparatus in accordance with the invention for reading a rotating optically readable record carrier 1. For the purpose of reading, a light beam emitted by a laser 2 is projected on the record carrier via a pivotal mirror 3 and an objective 4, the beam which is reflected by this record carrier being projected on a detector 6 via a semi-transparent mirror 5. Specifically in the case of a video disc player, the laser beam comprises one main beam and two sub-beams. The detector comprises 3 sub-detectors, so that by means of one tracking. error signal generator 15, a signal can be obtained which is a measure of the position of the landing spot of the laser beam relative to information tracks on the record carrier 1. By means of this signal the position of said spot is controlled by moving the entire optical system 16 in a radial direction by means of a mechanism 22, shown symbolically. The spot position is also controlled by the mirror 3 which can be tilted by means of a motor 7, enabling the landing spot of the beam to be moved over a limited number of tracks in a rapid and accurate manner. This is described comprehensively in inter alia the magazine *Philips Technical Review*, Vol. 33, 1973, No. 7, pages 186–189, U.S. Pat. No. 4,037,252, and German Patent Application No. 31.21.013, which has been laid open to public inspection, which publications are herewith incorporated by reference.

Figure 2:
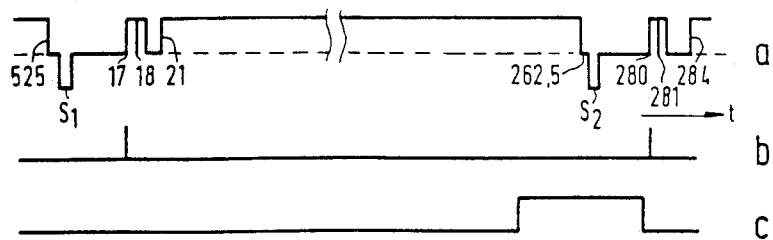
FIG. 2, consisting of a–c, shows some diagrams to explain the operation of the apparatus shown in FIG. 1.

FIG. 2a schematically represents the structure of a video signal which has been read from the record carrier 1. For each picture, said signal comprises two field synchronizing pulses $S_1$ and $S_2$, which after 16 picture lines are each followed by two picture lines (17 and 18) containing an address code (in principle it is also possible to use only one address code per picture). The visible part of the picture extends from line 21 up to line 262.5 (NTSC).

For some uses such as interactive players which co-operate with a game computer, it is desirable to be able to change the scene being reproduced without disturbing the field sequence. In order to do this, this, the landing spot of the laser beam must be shifted radially over a plurality of tracks by means of the pivotal mirror 3. In particular since for such a use a plurality of scenes may have been recorded in parallel and may change from track to track, it is essential that such a radial jump ends on the desired track because otherwise a scene other than the desired scene may be reached. In order to be able to ascertain directly whether such a jump is correct, it is therefore necessary that the address code contained in lines 17 and 18 is read after the jump and that the jump therefore always terminates before line 17 of the next field.

Since a picture disturbance of a few lines in the lower part of the picture during one field just before a change of scene is not very annoying, the maximum number of tracks to be jumped can be selected in such a way that the maximum jump starts a specific number of lines before the last line of the visible video picture and terminates just before line 17 of the next field. In order to minimize the picture disturbance, the instant at which the jump begins is always selected so that a minimal number of lines of the visible video picture is disturbed, jumping being effected in such a way that, if possible, a jump is made before the next address code after receipt of a jump command. This is possible by continuously measuring the time still available until the next address code appears.

In the embodiment shown in FIG. 1, this is achieved as follows. A detection circuit 8 derives a signal, for example as shown in FIG. 2b, which is synchronous with the address code, or with line 17, from the video signal recovered by means of the detector 6. This signal each time starts a counter 9, which counts a counting signal supplied by a clock-signal generator 10. This counter 9 then supplies a signal which in a continuous measure of the time which has elapsed after the read-out of the last address code and consequently of the time available until the appearance of the next address code. The jump command is applied to an input 11 as a signal which is a measure of the number of tracks to be jumped, for example in the form of a digital signal. In a circuit 12 this signal is converted into a signal which is a measure of the time required for this jump. By means of a comparator 13, the time required for the jump is compared with the running time and a signal is generated when the time available until the appearance of the next address code corresponds to the time required. FIG. 2c shows an example of such a signal. By means of this signal a jump-signal generator 14 is started. This jump-signal generator 14 controls a switch 23 which interrupts the connection between the tracking-error signal generator 15 and the motor 7, so that the motor 7 is controlled by this jump-signal generator 14 until a jump of the disired number of tracks is obtained. For this purpose the jump-signal generator 14 receives a signal indicating the number of tracks to be jumped from input 11 and a signal which indicates the passage of the tracks and which is supplied by a tracking-signal generator 15, of which examples are described in the publication referred to.

In its simplest form, the circuit 12 for generating a signal which is a measure of the time required for the jump can establish a linear relationship between the time required and the number of tracks to be jumped. If a more accurate relationship is required, the circuit 12 may perform an algorithm which defines said relationship or may contain a conversion table based on this relationship. For example, allowance can be made for the non-linearity of this relationship as a result of starting and braking the movement of the pivotal mirror 3. It is also possible to select a fixed jumping instant by starting those jumps which require a time shorter than a specific time, for example all jumps requiring time which is shorter than the time between the last visible picture line of the relevant field and the next address code, at the end of said last visible picture line, an extreme jumping instant being defined only for longer jumps.

The tracking-signal generator 15, in known manner, supplies a control signal to the drive motor via the switch 23, in order to keep the laser beam aimed at the track to be followed when no jump is performed.

Figure 3:
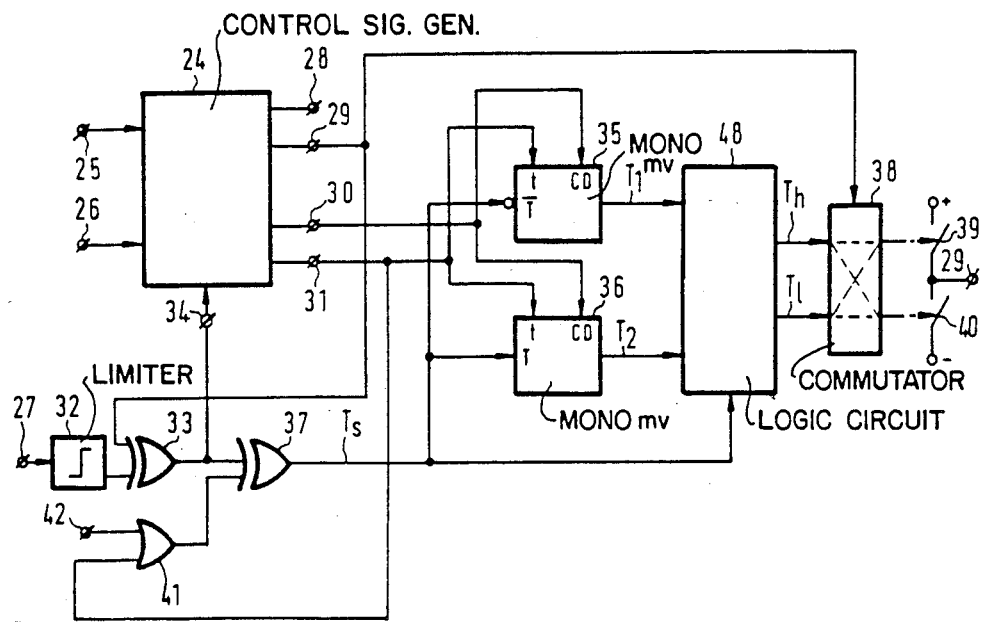
FIG. 3 shows a version of the jump-signal generator 14 in the apparatus shown in FIG. 1.

FIG. 3 shows a version of the jump-signal generator 14. It comprises a control-signal generator 24 on whose input 25 a signal appears which via input 11 indicates the number of tracks to be jumped and on whose input 26 a starting signal from a comparator 13 (FIG. 1) appears. On an output 28 a signal appears which sets the switch 23 to the position shown in FIG. 1 for the duration of the jump. On an output 29 a signal appears which indicates the direction of the jump. The radial tracking-error signal from the tracking-error signal generator 15 is applied to an input 27. By means of a limiter 32 the signal is converted into a squarewave signal which, when the laser beam moves over the tracks in the radial direction, exhibits a period corresponding to the time interval between the consecutive track passages and has edges appearing in the center of the tracks and midway between the tracks. By means of an exclusive-or circuit 33 the signal is logically combined with the direction signal on output 29, so that a signal is obtained which is independent of the direction of the jump. This signal is applied to input 34 of the control-signal generator 24 which counts the number of tracks passed by means of this signal. On output 30 the control-signal generator 24 supplies a logic signal from an instant which appears a fixed time, for example 350 $\mu$secs, after the start of the jump until the end of the jump, and on output 31 the control-signal generator supplies a logic signal from the beginning of the jump until an instant at which the number of tracks to be jumped (n) minus a predetermined number of tracks (x) has been passed.

The jump-signal generator further comprises a first monostable multivibrator circuit 35 which receives a trigger signal $T_2$ on an inverted trigger input $\overline{T}$, and a second monostable multivibrator circuit 36 which receives the trigger signal $T_s$ on the trigger input T. Via an exclusive-or gate 37 this trigger signal $T_s$ is supplied by the output of an exclusive-or gate 33, the gate 37 transferring this signal when a logic "1" appears on the other input of this gate 37. The monostable multivibrator circuits 35 and 36 are triggered by the signal on output 30 of the control-signal generator 24 and their time constant, i.e. the length of the pulse supplied, is changed over by the signal on the output 31 of the control circuit. The monostable multivibrators 35 and 36 supply signals $T_1$ and $T_2$, respectively, which are combined with the trigger signal $T_s$ in the logic circuit 48 to form the signals $T_h$ and $T_e$ in conformity with the relationships:

$$T_h = \overline{T_s} \cdot \overline{T_1} + T_s \cdot \overline{T_2}$$

$$T_e = \overline{T_s} \cdot \overline{T_2} + T_s \cdot T_1$$

Figure 4:
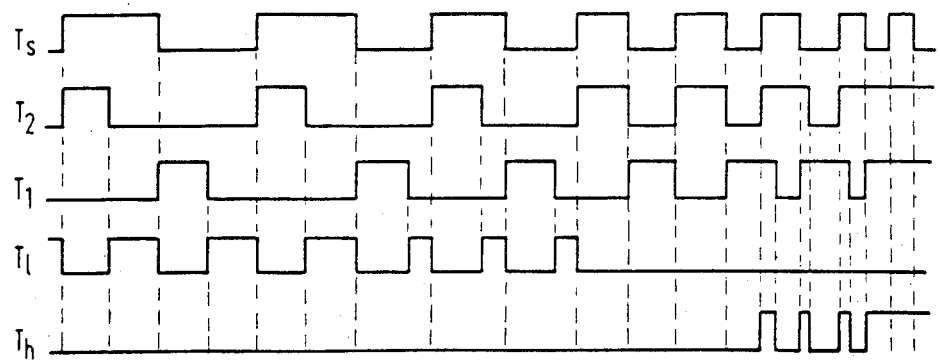
FIG. 4 shows some diagrams to explain the operation of a part of the generator shown in FIG. 3, and FIG. 5, consisting of a–f, shows some diagrams representing the various signals which appear when a jump is performed by means of the jump-signal generator shown in FIG. 3.

The operation of the two multivibrators 35 and 36 and the circuit 48 will be described with reference to FIG. 4, which shows the signals $T_s$, $T_e$, $T_2$, $T_1$ and $T_h$. When ignoring a possible inversion depending on the direction of the jump, the signal $T_s$ is the limited tracking signal whose period is inversely proportional to the jumping speed. As it is triggered on its inverting trigger input, the multivibrator 35 supplies pulses of a fixed duration each starting at the trailing edges of the signal $T_s$, while the multivibrator 36 supplies the same pulses starting at the leading edges. The resulting signal $T_e$ then has a relative pulse width which is proportional to the positive difference between the pulse width of the signal $T_s$ and the pulse width of the signals $T_1$ and $T_2$, determined by the time constant of the multivibrators, or a relative pulse width which is a measure of the extent to which the jumping speed deviates in a negative sense from a nominal speed defined by the time constant of the multivibrators. Similarly, the relative pulse width of the signal $T_h$ is a measure of the extent to which the jumping speed deviates from said nominal speed in a positive sense.

The signals $T_h$ and $T_e$ are applied to a commutator 38, which exchanges these signals depending on the jump direction indicated by the signal on output 29. Said signals $T_h$ and $T_e$ control switches 39 and 40 which supply a positive or a negative supply voltage to output 29 or which makes the output floating, so that the motor 7 accelerates, decelerates and freewheels, respectively.

Figure 5:
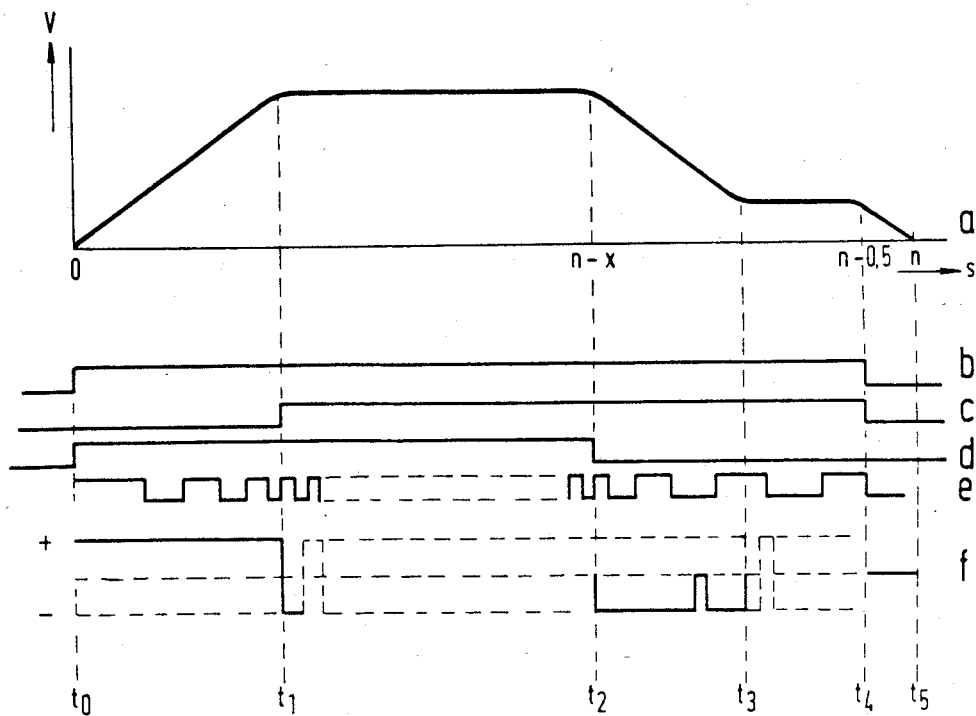

The operation of the entire jump-signal generator 14 is explained with reference to FIG. 5, in which FIG. 5a represents the jumping speed v as a function of time. FIGS. 5b, 5c and 5d represent the signals on outputs 28, 30 and 31 of the control-signal generator 24, FIG. 5e shows the limited radial tracking-error signal, and FIG. 5f shows a control signal for the motor 7 on output 29.

At an instant $t_o$ the comparator 13 supplies the starting command to input 26. Via output 28 (signal shown in FIG. 5b) switch 23 is changed over. Via output 31 (signal shown in FIG. 5d) the time constant of the multivibrators 35 and 36 is set to a small value corresponding to a high nominal jumping speed. Until an instant $t_1$, the signal on output 30 (signal shown in FIG. 5c) remains low, so that the two multivibrators are inoperative, the signals $T_1$ and $T_2$ are low, the signal $T_h$ is high and the signal $T_e$ is low. During the period $t_o$ to $t_1$ the motor 7 is then accelerated continuously (see FIG. 5a). At the instant $t_1$ the two multivibrators are started and the signals $T_h$ and $T_e$ corresponding to the diagram shown in FIG. 4 are generated. The jump is then performed with a substantially constant speed. After the passage of the number of tracks to be jumped (n) minus a predetermined number of tracks (x) at the instant $t_2$ the signal on output 31 (FIG. 5d) switches the time constant of the multivibrators to a high value corresponding to a low nominal speed. The circuit then also generates a train of braking pulses $T_1$ until at instant $t_3$ this lower nominal speed is reached. Subsequently, the jump continues with said constant lower speed until at the instant $t_4$ the number of tracks to be jumped minus half a track is reached. At this instant the signal on output 28 resets the switch 23 (FIG. 1) and locking-in to the desired track is effected via the tracking mechanism.

Since at the lower nominal speed the repetition frequency of the limited tracking-error signal decreases substantially, a signal on an input 42 is combined with the output signal of the exclusive-or gate 33 by means of the signal on output 31 via an or-gate 41 and an exclusive-or gate 37. A signal which is 90° phase-shifted relative to the limited radial error signal is applied to this input 42. When the signal on output 31 is low, which is the case at the lower nominal speed, this signal is added to the limited radial tracking-error signal in the exclusive-or gate 37, yielding a signal of twice the repetition frequency.

The device shown in FIG. 3 may be designed so that for a jump of less than a predetermined number of tracks (for example 25) the signal on output 31 (FIG. 5d) is kept low throughout jumping period, so that the mirror is controlled directly towards the lower of the two speeds.

It is to be noted that the apparatus described herein may be formed partly, in particularly parts 9, 12, 13 and 24, by a micro processor.

What is claimed is:

1. Apparatus for reading a disc-shaped record carrier in which video signals are recorded in substantially spiral tracks in such a way that corresponding picture elements of consecutive pictures are situated at substantially the same circumferential position on said record carrier, an address code being contained in at least one of two fields of each video picture in said video signals at a predetermined position in a field-blanking interval following a field-synchronizing pulse, said apparatus comprising:
   means for projecting a light beam onto the record carrier so as to form a landing spot thereon for reading the video signals recorded in the tracks, said light beam being modulated by the record carrier upon relative movement therebetween,
   means for recovering the video signal from said modulated light,
   means for determining the radial position of said landing spot relative to a track being read, said position determining means generating a radial tracking error signal indicative of the position of said landing spot relative to said track being read during read out of the video signal,
   means for moving said beam relative to said record carrier in a direction transverse to the track direction, said beam moving means being responsive to said radial error tracking signal so as to maintain said landing spot on said track being read, first means, coupled to said video signal recovering means, for generating a first signal which gives a continuous indication of the duration of a time period up to a reference point in the field-blanking interval which precedes the next address code in the video signal recorded in the track being read, means for receiving a jump command signal which is indicative of the number of tracks to be jumped, second means for generating, in response to said jump command signal, a second signal indicative of anticipated duration of said jump to be performed in response to said command signal, means for comparing said first and second signals, said comparing means generating a start signal when said duration of said time period up to said reference point is substantially equal to said anticipated duration of said jump, and third means for generating, in response to said start signal and said command signal, a control signal which is applied to said beam moving means and causes said beam moving means to shift said beam over a radial distance corresponding to the number of tracks to be jumped.

2. The apparatus according to claim 1 wherein said first means includes a counter which is started each time an address code appears in the video signal read from the record carrier.

3. The apparatus according to claim 1 or 2 including switching means for coupling said determining means to said third means during said radial shift of said beam, said determining means producing a signal indicative of the number of tracks passed by said beam during said shift, and wherein in response to said signal produced by said determining means, said third generating means generates a braking signal when said beam has passed over a predetermined number of tracks, said braking signal being applied to said moving means so as to reduce the speed at which said beam is moved.

* * * * *

UNITED STATES PATENT AND TRADEMARK OFFICE

Certificate

Patent No. 4,567,534            Patented January 28, 1986

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is Robertus W. C. Groen, Cornelis A. M. De Jonge, Lawrence M. Schwartz, Johannes C. Van Lier, Franz Herman Raetzer and John Joseph Stitt.

Signed and Sealed this Thirtieth Day of May 1989

Jeffery V. Nase
*Supervisory Petitions Examiner*
*Office of the Deputy Assistant*
*Commissioner for Patents*